(12) United States Patent  
Abali et al.

(10) Patent No.: US 10,397,365 B2  
(45) Date of Patent: Aug. 27, 2019

(54) METHOD TO REDUCE REACTIVATION TIME OF CLOUD BASED SERVICES

(71) Applicant: INTERNATIONAL BUSINESS MACHINES CORPORATION, Armonk, NY (US)

(72) Inventors: Bulent Abali, Tenafly, NJ (US); Hubertus Franke, Cortlandt Manor, NY (US); Chung-Sheng Li, Scarsdale, NY (US); Seetharami R. Seelam, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 328 days.

(21) Appl. No.: 14/934,879

(22) Filed: Nov. 6, 2015

(65) Prior Publication Data

US 2017/0134518 A1    May 11, 2017

(51) Int. Cl.  
    *H04L 29/08*    (2006.01)
(52) U.S. Cl.  
    CPC .............. *H04L 67/32* (2013.01); *H04L 67/10* (2013.01); *H04L 67/2847* (2013.01); *H04L 67/322* (2013.01)
(58) Field of Classification Search  
    None  
    See application file for complete search history.

(56) References Cited

U.S. PATENT DOCUMENTS

| 5,640,533 A * | 6/1997 | Hays ................... G06F 12/1027 711/133 |
| 2002/0019723 A1* | 2/2002 | Zwiegincew ........... G06F 12/08 702/186 |
| 2005/0071601 A1 | 3/2005 | Luick |
| 2012/0096227 A1 | 4/2012 | Dubrovin et al. |
| 2012/0278439 A1 | 11/2012 | Ahiska et al. |
| 2013/0055252 A1 | 2/2013 | Lagar-Cavilla et al. |
| 2014/0129814 A1 | 5/2014 | Bi et al. |
| 2014/0149668 A1 | 5/2014 | Chaudhary |

OTHER PUBLICATIONS

International Search Report, dated Mar. 31, 2017, issued in GB Application No. GB1617773.5, 7 pages.

* cited by examiner

*Primary Examiner* — Nam T Tran  
(74) *Attorney, Agent, or Firm* — Tutunjian & Bitetto, P.C.; Jennifer R. Davis

(57) ABSTRACT

A method for reducing reactivation time of services that includes examining page faults that occur during processing of a service after the service has been inactive to provide a plurality of prefetch groups, and formulating a prefetch decision tree from page fault data in the prefetch groups. Pages from an initial page table for the service following a reactivated service request are then compared with the prefetched pages in the resident memory in accordance with the prefetch decision tree. Pages in the page table that are not included in said prefetched pages are paged in. A process to provide to provide the service is executed using the page table. Executing the process substantially avoids page faults.

20 Claims, 7 Drawing Sheets

$\lambda_{ik}$: Probability of edge traversal

METHOD TO REDUCE REACTIVATION TIME OF CLOUD BASED SERVICES

BACKGROUND

Technical Field

The present invention relates generally to cloud based services and, in particular, enhancing the initial reactivation response time of a cloud service after a prolonged inactivity.

Description of the Related Art

In recent years, cloud computing services have been developed and deployed that allow customers to utilize computing resources without making capital expenditures to acquire such computing resources. Typically, a cloud computing service provider configures one or more computers and/or computer systems having at least one processor, memory storage and network access to the one or more computers and/or computer systems. These cloud computer systems may include any number of processors, memories and/or network access devices (e.g., network interface card(s) (NICs)) to allow any number of customers access to services provided by the computer systems. Services may include, but are not limited to, numerical processing, commercial transaction processing and/or web hosting.

SUMMARY

According to an aspect of the present principles, a method is provided for reducing reactivation time of cloud based services. In some embodiments, the method may include examining page faults that occur during processing of a service after the service has been inactive, wherein said examining includes analyzing an address that caused the page fault, and logging the address that caused the page faults in at least one prefetch group. A prefetch decision tree is formulated from the page fault data in the at least one prefetch group. The prefetch decision tree includes a plurality of edges providing a probability that a page will be touched during the service request. The method may continue with comparing pages from an initial page table for the service following a reactivated service request to determine whether the pages are in resident memory as prefetched pages in accordance with the prefetch decision tree. Pages in the page table that are not included in said prefetched pages are paged in. The method may continue with inserting previously paged out pages in an in parameter/out parameter vector for bulk restore. A process may be executed with a hardware processor to provide the service using the page table, wherein said executing substantially avoids page faults.

According to another aspect of the present principles, a system is provided for reducing reactivation time of services. In some embodiments, the system may include a page faults analyzer that examines the addresses of page faults during processing of a service after the service has been inactive, and a tracking module that logs the addresses that caused said page faults in at least one prefetch group. The system may further include a decision tree module that creates a prefetch decision tree from the page fault data in the at least one prefetch group. The prefetch decision tree may include a plurality of edges providing a probability that a page will be touched during the service request. Following a reactivated service request, a page comparison module determines whether pages from a page table for the service are in resident memory as prefetched pages in accordance with the prefetch decision tree, wherein pages in the page table that are not included in the prefetched pages are paged in. A page in insertion module inserts the paged out pages into memory through bulk restore. A page table updating module for inserting said paged in pages into said initial page table to provide an updated page table. The system may further include a process executing module to provide the service using the updated page table, wherein executing the process substantially avoids page faults.

In accordance with another aspect of the present disclosure a non-transitory article of manufacture is provided that tangibly embodies a computer readable program. In one embodiment, a non-transitory computer readable storage medium is provided that includes a computer readable program for reducing reactivation time for cloud based services. The computer readable program when executed on a computer causes the computer to perform the steps of examining page faults that occur during processing of a service after the service has been inactive, wherein examining may include analyzing an address that caused a page fault. The address that caused the page fault may be logged in at least one prefetch group. The steps executed by the computer readable program may further include formulating a prefetch decision tree from the page fault data in the at least one prefetch group. The prefetch decision tree may include a plurality of edges providing a probability that a page will be touched during the service request. The computer readable program further instructs for comparing whether pages from an initial page table for a service following a reactivated service request are in resident memory as prefetched pages in accordance with the prefetch decision tree, wherein pages in the page table that are not included in said prefetched pages are paged in. The steps executed may further include inserting previously paged out pages in an in parameter/out parameter vector for bulk restore. A process to provide the service is then executed using the page table, wherein the executing substantially avoids page faults.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are related to information technology (IT) services, and micro-services that are increasingly being provided through a cloud based consumption model. Many of these services are only active when requests are directed at them. Examples of such services are personal websites that rarely see traffic. The nature of this bursty activity lends itself to collocating many of such services on the same compute host, thus providing effective resource usage. Virtual machines, e.g., VMware, KVM, and Xen, provide for the ability to collocate on the order of tens of services. A virtual machine (VM) is an emulation of a particular computer system. Virtual machines operate based on the computer architecture and functions of a real or hypothetical computer, and their implementations may involve specialized hardware, software, or a combination of both. More recently, operating system containers provide the ability to locate on the order of hundreds of services to approximately a thousand services. In some examples, while the density of said services depends on the average central processing unit (CPU) usage, which can be inconsistent, each service does require some memory usage whether the service is active or not. In general, the collective memory requirement of these services far outnumber the available memory.

Traditionally, operating systems utilize virtual memory technology to temporarily store some of the memory of some of the services on disk until it is actively accessed, a technique known as paging or swapping. It has been determined that as memory is more and more overcommitted, which naturally follows from the high degree of services collocation, response times can significantly suffer. In particular, when a service is first reactivated after a long time of inactivity, many of its memory pages have been swapped out. As a result, when the processes associated with a long delayed service execute, they will experience a significant number of initial page faults that are incrementally triggered when a pagedout page is accessed significantly increasing the response time of service, which can lead to quality of service (QoS) violations. As used herein, a "page fault" is a type of interrupt, called exception, raised by computer hardware when a running program accesses a memory page that is mapped into the virtual address space, but not actually loaded into main memory. In some examples, resolving a page fault can take between ~100 μseconds (for expensive solid state device (SSD) based swap device) to ~10 milliseconds (for hard disk device (HDD) based swap devices). Under these circumstances, one can experience 10s to 100s of page faults until a service requests results in a response to the server, potentially delaying a service requests by seconds.

Figure 1:
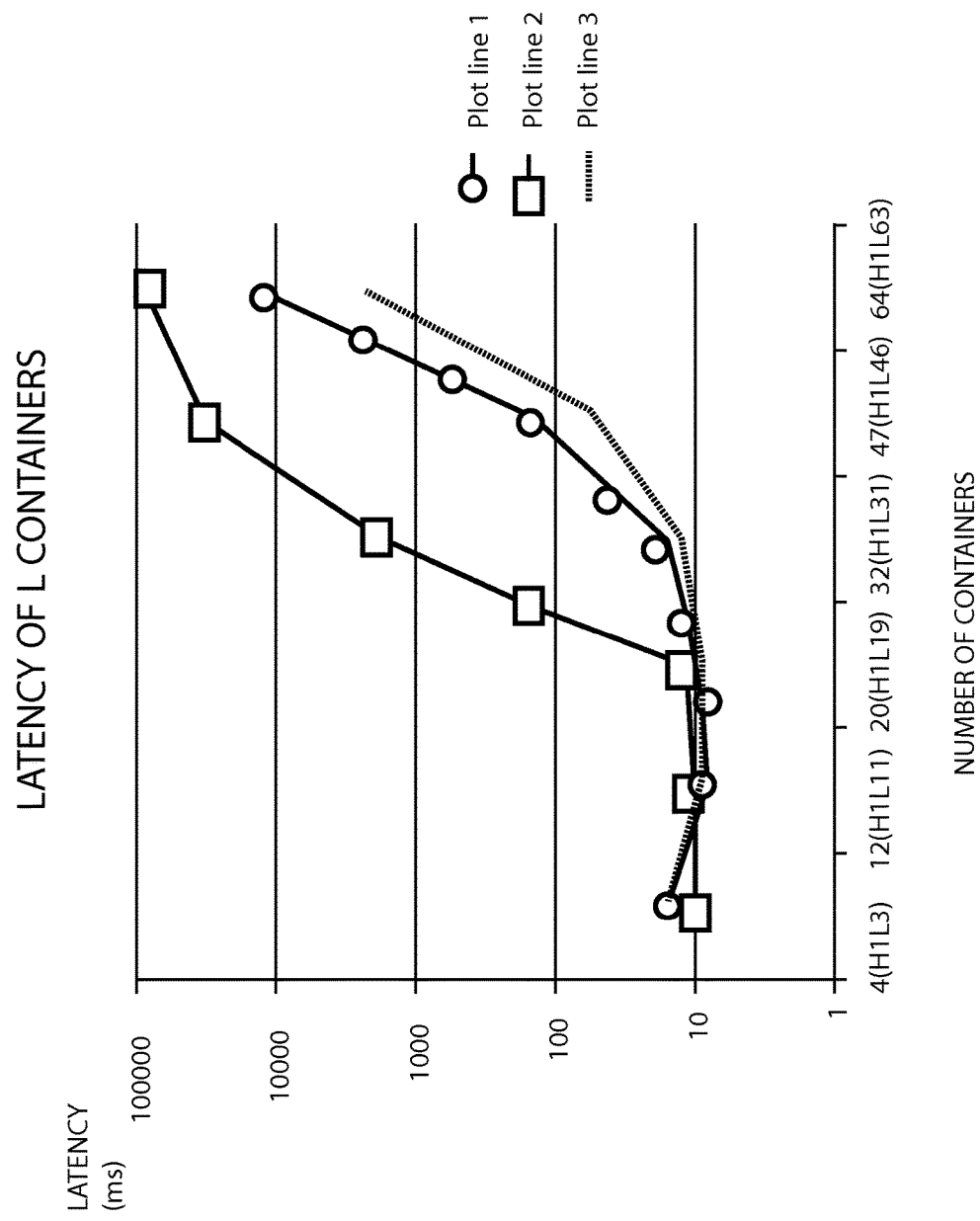
FIG. 1 is a plot of latency of memory containers experiencing page faults resulting from inactivity of a service from a memory page, in accordance with some aspects of the present disclosure.

FIG. 1 is a plot of the latency in memory containers as a function of the number of containers which demonstrates this effect. The y-axis represents a latency measurement, and the x-axis is the number of containers. Plot line 1 is a plot of the latency measured from a system including a power8 processor and a solid state drive (SSD) memory. Plot line 2 is a plot of the latency measured from a system including a power8 processor and a hard disk drive (HDD) memory. Plot line 3 is a plot line of the latency measured from a system including a power8 processor and two solid state drive (SDD) memory in a raid0 arrangement. As illustrated in FIG. 1, in some examples, as more and more containers are located on a system, the response time exponentially increases as the system runs out of memory resources. Note that in this case CPU utilization is very low, hence latency decay is at large attributable to the reloading of the memory from the swap device. The impact can be softened with moving from HDD to SSD to raided SSDs (two disks to access hence increased disk concurrency), but it is still exponential.

In some embodiments, the methods, systems and computer program products provided herein provide for enhancing the initial reactivation response time of a service after a prolonged inactivity. In some embodiments, in order to avoid the cost associated with a large number of page faults that are incrementally experienced when executing a service, the methods, systems and computer program products that are disclosed herein create a method to predict the likely set of pages that will be touched during the handling of a service request, and ensures that these pages are all prefetched and resident through a single or a small number of vector I/O operations, thus significantly reducing the overhead of a series of on-demand incremental page faults.

In some examples, prefetching occurs when a processor requests an instruction or data from main memory before it is actually needed. Once the instruction, e.g., data, comes back from memory, it is placed in a cache. When an instruction is actually needed, the instruction, e.g., data, can be accessed much more quickly from the cache than if it had to make a request from memory. As used herein "vectored I/O", also known as scatter/gather I/O, is a method of input and output by which a single procedure-call sequentially writes data from multiple buffers to a single data stream or reads data from a data stream to multiple buffers. The buffers are given in a vector of buffers. Scatter/gather refers to the process of gathering data from, or scattering data into, the given set of buffers. Vectored I/O can operate synchronously or asynchronously.

In some embodiments, the operating system is enhanced with the ability to track the set of addresses triggering page faults after some long deactivation, store this sequence with the process, and in subsequent reactivations bulk restore these pages. In some embodiments, the method further provides for means to track variations of the address sequence and the effectiveness of the sequence, as to avoid unnecessary page restorations. In some embodiments, the method further provides the ability to continuously learn the response behavior. The methods, systems and computer program products of the present disclosure are now described in greater detail with reference to FIGS. 2-7.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 2:
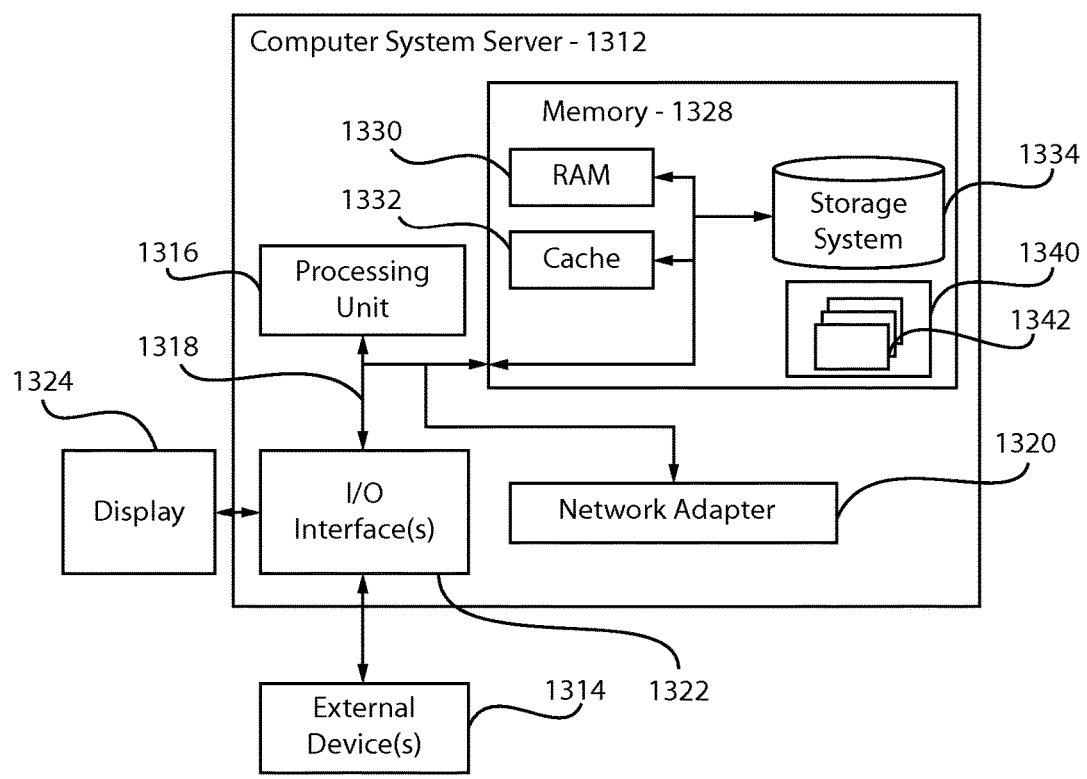
FIG. 2 shows an exemplary cloud computing node, in accordance with an embodiment of the present principles.

Referring now to FIG. 2, a schematic of an example of a cloud computing node 1310 is shown. Cloud computing node 1310 is only one example of a suitable cloud computing node and is not intended to suggest any limitation as to the scope of use or functionality of embodiments of the invention described herein. Regardless, cloud computing node 1310 is capable of being implemented and/or performing any of the functionality set forth hereinabove.

In cloud computing node 1310 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 1312 in cloud computing node 1310 is shown in the form of a general-purpose computing device. The components of computer system/server 1312 may include, but are not limited to, one or more processors or processing units 1316, a system memory 1328, and a bus 1318 that couples various system components including system memory 1328 to processor 1316.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1312 typically includes a variety of computer system readable media. Such media may be any available media that is accessible by computer system/server 1312, and it includes both volatile and non-volatile media, removable and non-removable media.

System memory 1328 can include computer system readable media in the form of volatile memory, such as random access memory (RAM) 1330 and/or cache memory 1332. Computer system/server 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As will be further depicted and described below, memory 1328 may include at least one program product having a set (e.g., at least one) of program modules that are configured to carry out the functions of embodiments of the invention.

Program/utility 1340, having a set (at least one) of program modules 1342, may be stored in memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein. For example, the program modules 1342 can include the modules described with reference to FIG. 2.

Computer system/server 1312 may also communicate with one or more external devices 1314 such as a keyboard, a pointing device, a display 1324, etc.; one or more devices that enable a user to interact with computer system/server 1312; and/or any devices (e.g., network card, modem, etc.) that enable computer system/server 1312 to communicate with one or more other computing devices. Such communication can occur via Input/Output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples, include, but are not limited to: microcode, device drivers, redundant processing units, external disk drive arrays, RAID systems, tape drives, and data archival storage systems, etc.

Figure 3:
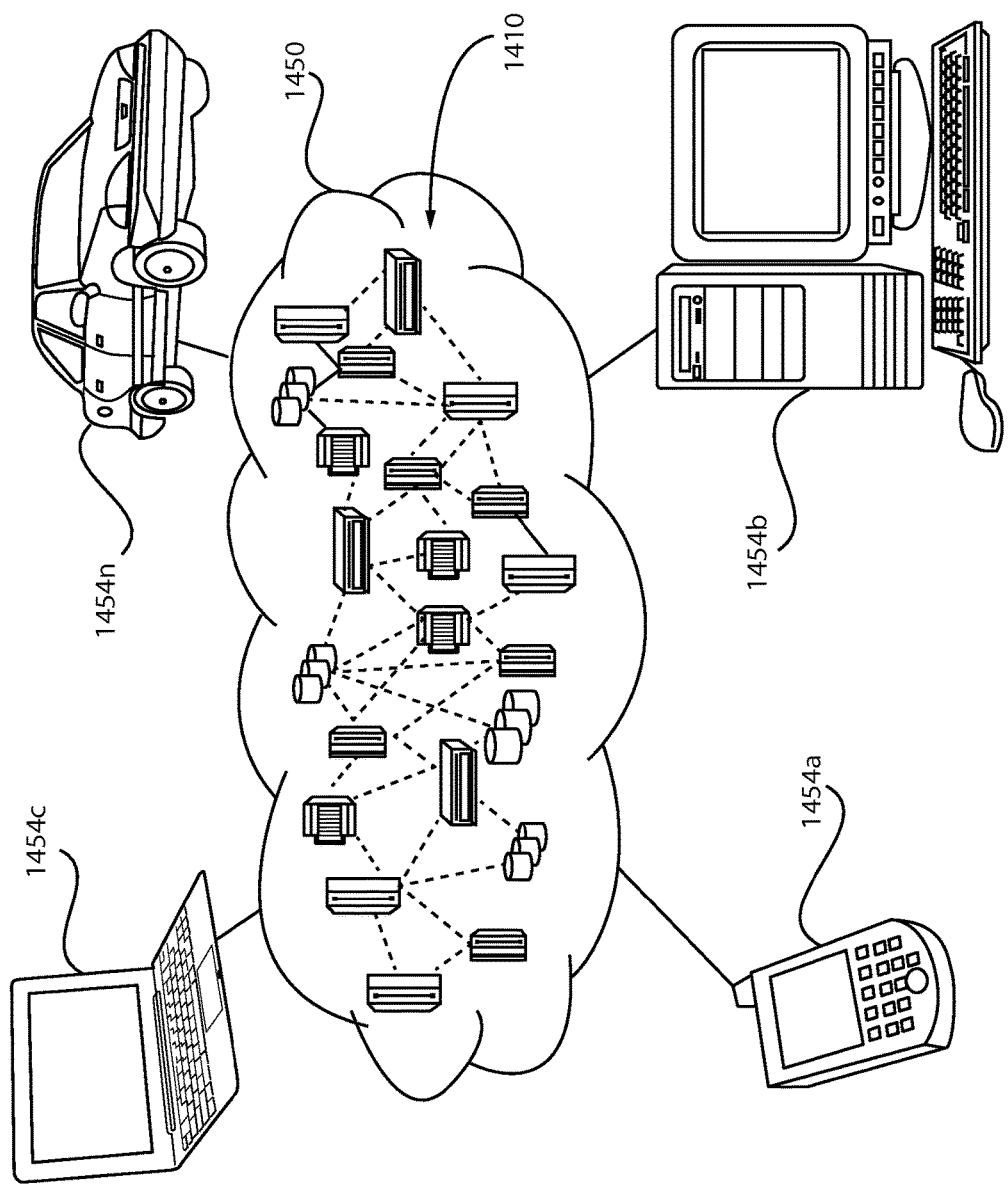
FIG. 3 shows an exemplary cloud computing environment, in accordance with an embodiment of the present principles.

Referring now to FIG. 3, an illustrative cloud computing environment 1450 is depicted. As shown, cloud computing environment 1450 comprises one or more cloud computing nodes 1410 with which local computing devices used by cloud consumers, such as, for example, personal digital assistant (PDA) or cellular telephone 1454*a*, desktop computer 1454*b*, laptop computer 1454*c*, and/or automobile computer system 1454*n* may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454*a*-*n* shown in FIG. 3 are intended to be illustrative only and that computing nodes 1410 and cloud computing environment 1450 can communicate with any type of computerized device over any type of network and/or network addressable connection (e.g., using a web browser).

Figure 4:
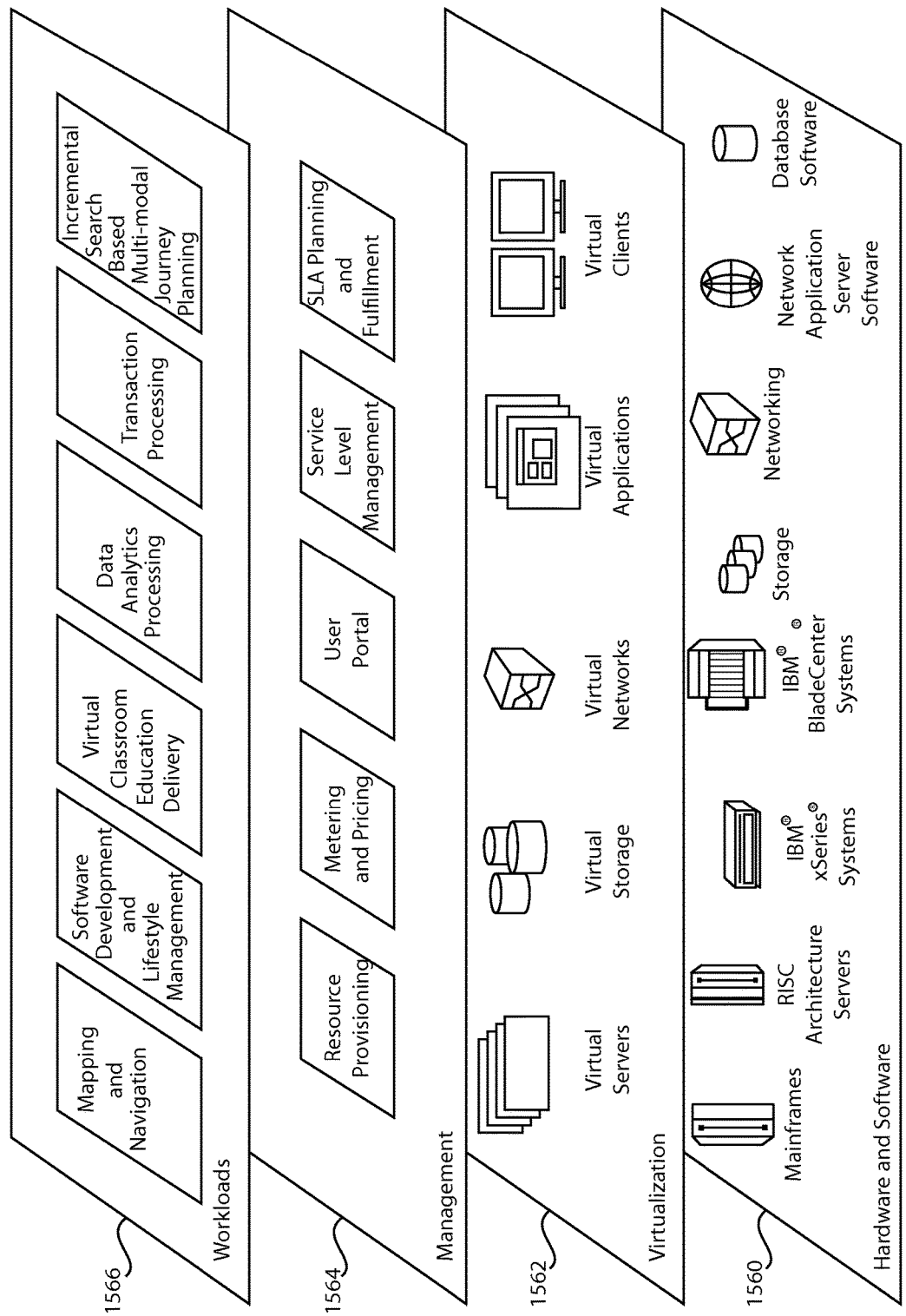
FIG. 4 shows exemplary abstraction model layers, in accordance with an embodiment of the present principles.

Referring now to FIG. 4, a set of functional abstraction layers provided by cloud computing environment 1450 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 1560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1562 provides an abstraction layer from which the following examples of virtual entities may be provided: virtual servers; virtual storage; virtual networks, including virtual private networks; virtual applications and operating systems; and virtual clients.

In one example, management layer 1564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and reactivation time of cloud based service processing.

Figure 5:
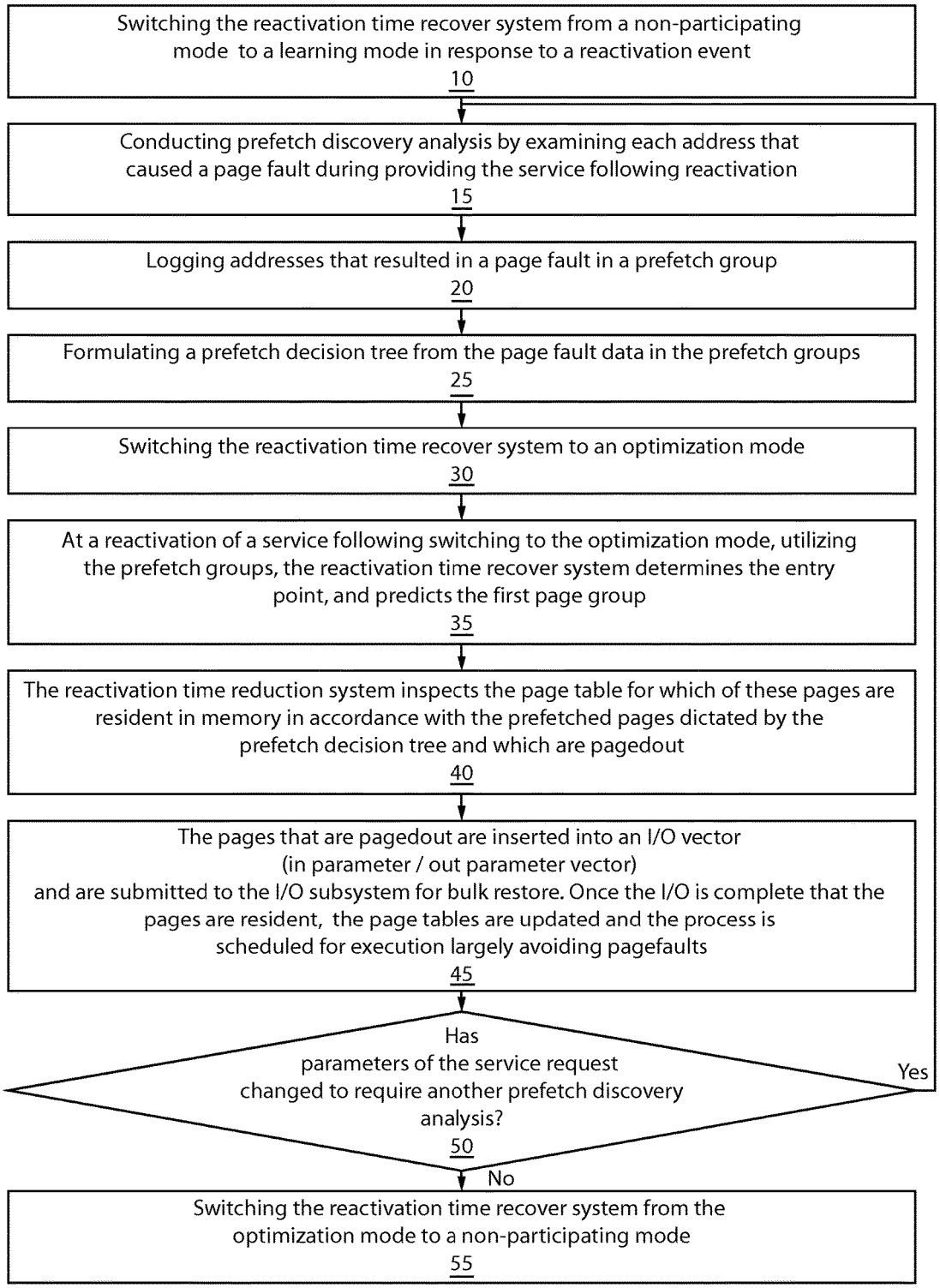
FIG. 5 is a is a flow/block diagram illustrating one embodiment of method for reducing reactivation time of cloud based services, in accordance with one embodiment of the present disclosure.

FIG. 5 depicts one embodiment of method for reducing reactivation time of cloud based services. In some embodiments, the method of the present disclosure can provide one or more prefetch groups associated with process object; a tag associated with the process to enable address tracing; a delay parameter associated with a process (or global) that specifies how long a process should be inactive before this method is activated; and a mode that describes either a non-participating, learning or optimization mode. Address tracking may include tagging a process to track address in response to a request for optimization.

A prefetch group can be a set of pages of instructions or data, which are ensured to be resident in memory before they are actually needed. The instructions in the prefetch group correspond to a service. The service can be infrastructure, applications, and business processes that can be delivered to a user via the cloud environment. A process is the functionality, e.g., use of code or instructions or data, taken by the cloud environment to provide the service to a user. The process objective is the desired outcome of providing that service to the user.

Some examples of services that may be used with the methods, systems and computer program products disclosed herein may include, but are limited to, social network services, email services, e.g., web based email services, document/spreadsheet hosting services, health care services, governmental function services, database services, messaging services, data analytic services and combinations thereof.

As noted above, the method includes a system (hereafter referred to as reactivation time reduction system) that can employ three modes, e.g., non-participating, learning and optimization modes, in order to reduce reactivation times for services. In some embodiments, by default the processes in the system are in non-participating mode, and hence the optimization described in here are not being applied to a process. In some embodiments, the method can begin at step 10 with switching a reactivation time reduction system from a non-participating mode to a learning mode in response to the reactivation of a process for delivering a service. In some examples, a service can be woken up due to one the following reasons: health check pings, monitoring pings (different ports from health checks), security pings, sidecar pings (these are not main application processes but agents running next to the main application), application entry points and combinations thereof. It is noted that the above examples are only some examples of events that can reactivate a service, and therefore, switch the reactivation time reduction system from the non-participating to learning state, and that it is not intended that these examples limit the present disclosure. For example, it has been contemplated that any command, signal or function can be employed by the reactivation time reduction system to signal the system to switch from the non-participating mode to the learning mode. All of aforementioned example events could result in different pre-fetch patterns so in some embodiments it may be advantageous for them to be detected, learned and applied in providing an optimized reactivation time.

In some embodiments, when the reactivation time reduction system is put into the learning mode, e.g., after the system has been inactive for a while, upon reactivation of the service, each and every address resulting in a page fault is examined through a pre-fetch discovery at step 15 of the method depicted in FIG. 5. Page faults are raised by computer hardware when a running program accesses a memory page that is mapped into the virtual address space, but not actually loaded into main memory. In some embodiments, the hardware that can detect a page fault is the processor's memory management unit (MMU), while the exception handling software that handles page faults is generally a part of the operating system kernel. The page faults detected and examined during the pre-fetch discovery at step 15 of the method illustrated in FIG. 5 may include minor page faults, soft page faults, major or hard page faults and invalid page faults. Operating systems such as Windows and UNIX (and other UNIX-like systems) provide differing mechanisms for reporting errors caused by page faults. In some embodiments, windows uses structured exception handling to report page fault-based invalid accesses as access violation exceptions, and UNIX (and UNIX-like) systems typically use signals, such as SIGSEGV, to report these error conditions.

Each and every address that results in a page fault may be logged in one of the prefetch groups at step 20. For example, the page faults, and associated addresses, may be logged and saved in a buffer. In some embodiments, a multitude of prefetch groups is required to be stored when it is discovered that the service follows a different path.

In some embodiments, with subsequent reactivations for the service, the process will experience likely similar page faults, because the services typically have one or more service entry points that starts with the reception of a message or timer, and then triggers a particular code and data path. In some embodiments, before updating the prefetch group at step 20, the analysis at step 15, may identify whether previously recognized page fault inducing addresses have been skipped, at which point they remain in the prefetch group. If not a prefetch group branch is created. If at a subsequent page fault it is determined that a new subsequence of addresses was introduced, the subsequence is inserted at that point. When multiple concurrent subsequences are detected that appear to merge later they can be separately maintained.

In a following step, the method formulates a prefetch decision tree at step 25. The result of the analysis and logging of prefetch groups at steps 15 and 20 can be used to formulate the decision tree of page groups that represent the different access behaviors of the application/service. One method of forming a decision trees is to log addresses, cluster similar sequences of addresses and identifying divergence in such clustering. In some embodiments, when divergence is detected, a new prefetch group is created and a branch is created by breaking up one prefetch group in a front part, a branch and subsequent continuations prefetch groups. The front part and each continuation group are logically connected, and probability of following either path is associated with said connection. The probability can be established by counting the frequency of traversal. By creating the decision tree, the method effectively addresses two principals, i.e., 1) a spatiotemporal representation of memory usage, and 2) a context indexible group of pages. Spatiotemporal representation of the memory usage, especially during the initial phase of loading the pages for each service, can provide a succinct representation of the "context" and state information for "indexing" the appropriate "group of pages" to be loaded. The context indexible group of pages provides that the traversal of the pages can be represented by a Markov model or a Baysian net model.

In some embodiments, the prefetch decision tree can provide that the next group of pages to be loaded during an activation event or reactivation event of a service in a manner that can minimize the page fault rate. The prefetch decisions may be data driven, so the prefetch decision tree should capture the context for the access point to activating the service. The term "context", as used herein describes the scenario under which a service is activated and which likely path of page (instructions and data) it will follow to deliver the requested service. In addition to the spatiotemporal pattern traversed by the container processes, the input data should also be part of the state information.

Figure 6:
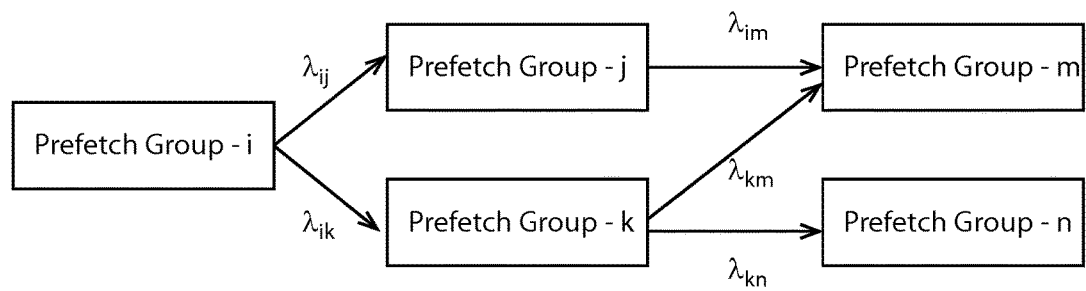
FIG. 6 is a schematic illustrating on embodiment of a prefetch decision tree, in accordance with the present disclosure.

FIG. 6 depicts one embodiment of a prefetch decision tree. The edges $\lambda_{ij}$, $\lambda_{ik}$, $\lambda_{im}$, $\lambda_{km}$, $\lambda_{kn}$ can be tagged with a probability, or even with a data context that is examined. In one embodiment, the tags represent the likelihood of traversing from one said front prefetch group to a succeeding prefetch group as for instance establish by the number of observed traversals during the learning phase. In another embodiment the tag can be associated with examining data (for instance a particular variable or content of a received message) to determine which edge to follow. For example, receiving a web request for email might trigger a different prefetch group than for receiving a web request for a video stream. Each prefetch group, e.g., prefetch group-i, prefetch group-j, prefetch group-k, prefetch group-m, and prefetch group-n, includes a likely set or sequence of pages that will be touched during the handling of a service request. By tagging the edges with a probability or data context, one or more prefetch groups can be associated with a process objective. In one embodiment the most likely edge will be prefetched. In one embodiment, a page fault will happen, and when they can be matched to any page group, that page group will be prefetched.

The prefetch decision tree ensures that the pages in the prefetch group can all be prefetched and resident on memory, when a service has been reactivated after a long period of non-activation. By providing that the pages for a service that can be activated after a period of inactivity, in prefetched groups that are resident in a form of memory, the reactivation time reduction system may reduce the overhead of a series of on-demand incremental page faults. The reactivation time reduction system reduces the overhead by providing the series of pages of a process objective in response to a service request in a prefetched fashion in accordance with the decision tree, and provides the prefetched series of pages including page addresses in the event of a page fault that may occur in response to a service request.

Reactivation can be predicted (e.g. for periodic reactivation) and a prefetch queue can be created that prioritizes the containers/processes that are anticipated. For instance, if a service is woken up every minute to do a health check, this fact can be learned and associated with the prefetch group. Henceforth, that behavior can be predicted and prefetching can be initiated in time to avoid major delays.

Referring to FIG. 5, after the system determines that the behavior of the process upon reactivation can be learned and understood at large, it puts the process into optimization mode at step 30. In some embodiments, determining that the behavior of a process has been learned includes creating a specific number of prefetch groups in response to a service request.

In some embodiments, when the reactivation time reduction system is in the optimization mode, at the next reactivation point following a long period of inactivity, the operating system utilizes the prefetch groups, determines the entry point, and predicts the first page group at step 35 of the method illustrated in FIG. 5. The entry point is the code that is immediately executed when request arrives.

Referring to FIG. 6, the first page group is identified as prefetch group-i. The first page group may be predicted by analyzing the entry point data, e.g., entry point address, and the type of service being requested by the user at the entry point.

The reactivation time reduction system may then inspect the page table for which of these pages are resident in memory in accordance with the prefetched pages dictated by the prefetch decision tree (described at step 25 of the method, in which an example is provided in FIG. 6), and which are pagedout, at step 40. In a virtual memory system, it is common to map between virtual addresses and physical addresses by means of a data structure called a page table. The page number of an address is usually found from the most significant bits of the address; the remaining bits yield the offset of the memory location within the page. The page table is normally indexed by page number and contains information on whether the page is currently in main memory, and where it is in main memory or on disk. A page that is available in physical memory may be referred to as being paged in, while a page that is not available in physical memory may be referred to as being paged out.

At step 45 of the method depicted in FIG. 5, the pages that are pagedout are inserted into an I/O vector (in parameter/out parameter vector) and are submitted to the I/O subsystem for bulk restore. An in-parameter is a function parameter that points to a location for the caller, i.e., user, to receive data from a function, i.e., process for the service. An outer parameter is a function parameter that points to a location for the caller to receive data from the function. An in parameter is a function parameter that supplies data from the caller to the function, i.e., process for the service. Vectored I/O is a method of input and output by which a single procedure-call sequentially writes data from multiple buffers to a single data stream or reads data from a data stream to multiple buffers. The buffers are given in a vector of buffers. Once the I/O is complete and the pages are resident, the page tables are updated and the process is scheduled for execution largely avoiding page faults.

At step 50, the reactivation time reduction system may switch to non-participating mode or back to learning mode, i.e., back to step 15 with conducting prefetch discovery. In some embodiments, the learn and optimization phases are continuous and integrated. The system continuously learns and improves the prefetch decision tree. If it is determined that an edge probability is below a threshold, the edge and follow group can be dropped (unless there is a different path to the prefetch group). Switching the reactivation time reduction system from the optimization mode to the learning mode may occur when the parameters of the service request change to require another prefetch discovery analysis. For example, when a fork in a decision tree is reached and subsequent page fault indicate that previously formed prefetch groups do not cover the current set of page faults, the method can switch back into learning mode and continue to update the decision tree. In one embodiment, the learning phase and optimization phase can be concurrently active, i.e. the system optimize (prefetch) while as the same time also learns unknown contexts and page access patterns.

At step 55 of the method depicted in FIG. 5, the reactivation time reduction system may switch from the optimization mode to the non-participating mode when the parameters of the service request do not change to require another prefetch discovery analysis. For example, when a service has been inactive for a long period time, previously learned decisions trees might no longer be valid. The time period at which this inquiry is made may be within hours or days from when a service has been deactivated without reactivation. Once in the non-participating mode a delay parameter associated with a process (or global) can specify how long a process should be inactive before this method is activated at step 10.

Alternative representations of the prefetch group are possible. For instance, rather than storing full addresses the distance from the previous one can be stored.

Figure 7:
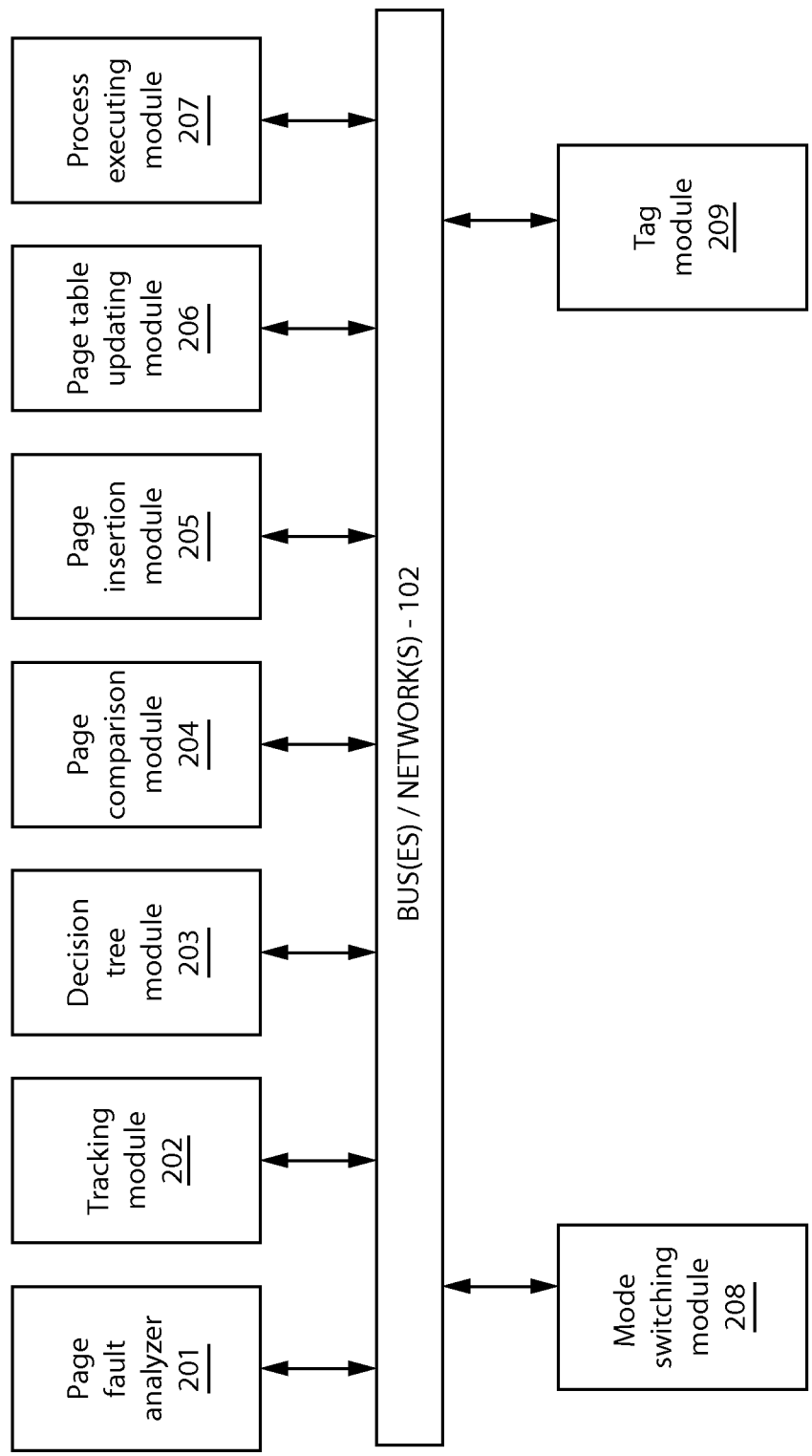
FIG. 7 is a block diagram illustrated one embodiment of an exemplary system for reducing reactivation time of cloud based services, in accordance with an embodiment of the present principles.

FIG. 7 shows an exemplary system 200, i.e., reactivation time reduction system, for reducing reactivation time for services in cloud environments, in accordance with an embodiment of the present principles. The system 200 that is depicted in FIG. 7 may be integrated into the computer service system 1312 depicted in FIG. 2. For example, the system may provide the program/utility 1340, having a set (at least one) of program modules 1342, may be stored in memory 1328 of the computer service system 1312 depicted in FIG. 2. Further, it is to be appreciated that system 200 may perform at least part of the method described herein including, for example, at least part of method of FIG. 5.

Referring to FIG. 7, a reactivation time reduction system 200 for reducing reactivation time of cloud based services may be provided that includes a page faults analyzer 201, a tracking module 202, a decision tree module 203, a page comparison module 204, a page insertion module 205, a page table updating module 206, a process executing module 207, a mode switching module 208, and a tag module 209. Each of the aforementioned modules may be connected to a bus 102. Each of the page faults analyzer 201, the tracking module 202, the decision tree module 203, the page comparison module 204, the page insertion module 205, the page table updating module 206, the process executing module 207, the mode switching module 208, and the tag module 209 may include a module, segment, or portion of instructions or data, which comprises one or more executable instructions or data for implementing the specified logical function(s), which may be embodied on a form of memory. The bus 102 couples the various system components, which can include the page faults analyzer 201, the tracking module 202, the decision tree module 203, the page comparison module 204, the page insertion module 205, the page table updating module 206, the process executing module 207, the mode switching module 208 and the tag module 209, to a processor, e.g., hardware processor for executing the instructions or data provided by these components. For example, the bus 102 depicted in FIG. 7 may be connected to the bus 1318 of the computer server system 1312 depicted in FIG. 2 to connect these components to the hardware processor of the computer server system 1312 that is identified by reference number 1316.

In some embodiments, the page faults analyzer 201 examines the addresses of page faults during processing of a service after the service has been inactive. Further details about the page faults analyzer is provided by the description of step 15 of the method depicted in FIG. 5.

In some embodiments, the tracking module 202 logs the address that caused the page faults in the at least one prefetch group. Further details about the tracking module 202 is provided by the description of step 20 of the method depicted in FIG. 5.

The decision tree module 203 creates a prefetch decision tree, e.g., as depicted in FIG. 6, from the page fault data in the at least one prefetch group. The prefetch decision tree may include a plurality of edges providing a probability that a page will be touched during the service request. The functionality of the decision tree module 203 has been described above in step 25 of the method depicted in FIG. 5, as well as the description of the decision tree depicted in FIG. 6.

In some embodiments, the page comparison module 204, which is activated following a reactivated service request is further described with reference to steps 35 and 40 of the method illustrated in FIG. 5. For example, the page comparison module 204 compares pages from an initial page table for a service to determine whether the pages are in resident memory as prefetched pages in accordance with the prefetch decision tree.

The page insertion module 205 inserts the previously paged out pages in an in parameter/out parameter vector for bulk restore. The page table updated module 206 inserts the paged in pages into the initial page table to provide an updated page table for execution. Further details regarding the functionality of the page insertion module 205 and the page table updating module 206 are provided above in the description of step 45 of the method described with reference to FIG. 5.

Referring to FIG. 7, the reactivation time reduction system 200 also includes process executing module 207 to provide, i.e., run, the service using the updated page table, wherein as described above executing substantially avoids page faults. The reactivation time reduction system 200 further includes the mode switching module 208 and the tag module 209. The mode switching module 208 can change the mode of the reactivation time reduction system 200 between non-participating mode, learning mode, and optimization mode. Further details regarding the mode switching module 208 have been described above with respect to steps 10, 30 and 50 of the method described with reference to FIG. 5. The mode switching module 208 may include sub-module that provides a delay parameter associated with a process (or global) that specifies how long a process should be inactive before the reaction time reduction system 200 is activated. The tag module 209 may provide a tag associated with the process to enable tracing.

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 200 are readily contemplated by one of ordinary skill in the art given the teachings of the present principles provided herein.

It is also noted that each of the aforementioned modules do not need to implemented in hardware. For example, each of the page faults analyzer 201, a tracking module 202, a decision tree module 203, a page comparison module 204, a page insertion module 205, a page table updating module 206, a process executing module 207, a mode switching module 208, and a tag module 209 may be provided as software instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for reducing reactivation time of services comprising:
   examining page faults that occur during processing of a service after the service has been inactive, wherein said examining includes analyzing physical addresses that caused said page faults;
   logging said physical addresses that caused said page faults in at least one prefetch group;
   formulating a prefetch decision tree from the physical addresses from page fault data in said at least one prefetch group, wherein the prefetch decision tree includes a plurality of edges providing a probability that a page will be touched during a service request;
   comparing whether addresses for pages from an initial page table for said service following a reactivated service request are in resident memory as prefetched physical addresses for pages in accordance with the prefetch decision tree, wherein physical addresses for pages in the page table that are not included in said prefetched pages are paged in; and
   executing a process with a hardware processor to provide said service using said physical addresses for pages in the page table, wherein said executing substantially avoids said page faults.

2. The method of claim 1, wherein said examining page faults that occur during processing of a service after the service has been inactive is provided by a reactivation time reducing system that is switched from a non-participating mode to a learning mode by a reactivation event.

3. The method of claim 2, wherein the reactivation event comprises health check pings, monitoring pings, security pings, sidecar pings, application entry points, or combinations thereof.

4. The method of claim 1 further comprising inserting previously paged out pages in an in parameter/out parameter vector for bulk restore.

5. The method of claim 1, wherein the page faults comprise minor page faults, soft page faults, major page faults, hard page faults, invalid page faults or a combination thereof.

6. The method of claim 1, wherein said services are provided in a cloud computing environment.

7. The method of claim 2, wherein said comparing pages from the initial page table for said service following the reactivated service request to determine whether said pages are in resident memory as prefetched pages comprises:
   switching the reactivation time reducing system from said learning mode to an optimization mode;
   determining an entry point; and
   predicting a first page group for use in the prefetch decision tree.

8. The method of claim 7, wherein said predicting the first page group comprises analyzing an entry point address, and a type of said service being requested by the user at the entry address.

9. The method of claim 1, wherein said inserting said previously paged out pages in an in parameter/out parameter vector for bulk restore comprises submitting the in parameter/out parameter vector into an input/output subsystem.

10. A system for reducing reactivation time of services comprising:
    a page faults analyzer that examines physical addresses of page faults during processing of a service after the service has been inactive;
    a tracker that logs the physical addresses that caused said page faults in at least one prefetch group;
    a decision tree analyzer that creates a prefetch decision tree from the physical addresses from page fault data in said at least one prefetch group, wherein the prefetch decision tree includes a plurality of edges providing a probability that a physical page address will be touched during a service request;
    a page comparator that following a reactivated service request compares physical page addresses from an page table for said service to determine whether said physical pages addresses are in resident memory as prefetched page addresses in accordance with the prefetch decision tree, wherein the physical page addresses in the page table that are not included in prefetched page addresses are paged in;
    a page in insertor that inserts the paged out page physical addresses into memory through bulk restore;
    a page table updator for inserting said paged out physical addresses into said initial page table to provide an updated page table; and
    a process executor to provide said service said updated page table, wherein said executing substantially avoids said page faults.

11. The system of claim 10 further comprising a mode switch for selecting a non-participating mode, a learning mode and an optimization mode for the system, wherein the page faults analyzer examines the addresses of page faults in response to the system being in the learning mode, the page comparison module analyzes the initial page table in response when the system is in the optimization mode, and the system enters the non-participating mode in response to deactivation event.

12. The system of claim 11, wherein the learning mode is activated by a reactivation event comprising health check pings, monitoring pings, security pings, sidecar pings, application entry points, or a combinations thereof.

13. The system of claim 11, a tag module that assigned tags to processes to enable address tracing.

14. The system of claim 10, wherein a prefetch is a set of instructions taken from main memory prior to being needed by said process for providing said service.

15. The system of claim 10, wherein the page faults comprise minor page faults, soft page faults, major page faults, hard page faults, invalid page faults or a combination thereof.

16. The system of claim 10, wherein said system is integrated into a computer service system providing a cloud computing environment for providing said services.

17. The system of claim 10, wherein said comparing pages from the initial page table for said service following the reactivated service request to determine whether said pages are in resident memory as prefetched pages comprises:
 switching the reactivation time reducing system from said learning mode to an optimization mode;
 determining an entry point; and
 predicting a first page group for use in the prefetch decision tree.

18. The system of claim 10, wherein said predicting the first page group comprises analyzing an entry point address, and a type of said service being requested by the user at the entry address.

19. A non-transitory computer readable storage medium comprising a computer readable program for reducing reactivation time of services, wherein the computer readable program when executed on a computer causes the computer to perform the steps of:
 examining page faults that occur during processing of a service after the service has been inactive, wherein said examining includes analyzing physical addresses that caused said page faults;
 logging said physical addresses that caused said page faults in at least one prefetch group;
 formulating a prefetch decision tree from the physical addresses from the page fault data in said at least one prefetch group, wherein the prefetch decision tree includes a plurality of edges providing a probability that a page will be touched during a service request;
 comparing whether physical addresses for pages from an initial page table for said service following a reactivated service request are in resident memory as prefetched addresses for pages in accordance with the prefetch decision tree, wherein physical addresses for pages in the page table that are not included in said prefetched pages are paged in;
 inserting previously paged out pages in an in parameter/out parameter vector for bulk restore; and
 executing a process to provide said service using said physical addresses for pages in the page table, wherein said executing substantially avoids said page faults.

20. The non-transitory computer readable storage medium of claim 19, wherein said services are provided in a cloud computing environment.

* * * * *